United States Patent [19]

Long et al.

[11] Patent Number: 5,248,264
[45] Date of Patent: Sep. 28, 1993

[54] LATCH ASSEMBLY AND CARRIER FOR A PORTABLE PRODUCT

[75] Inventors: Christopher R. Long, Boca Raton; Melvin Teitzman, Lantana; Michael S. Bent, Greenacres, all of Fla.

[73] Assignee: Motorola, Inc., Schaumburg, Ill.

[21] Appl. No.: 880,800

[22] Filed: May 8, 1992

[51] Int. Cl.$^5$ ............................................. H01R 4/50
[52] U.S. Cl. ...................................... 439/347; 439/929
[58] Field of Search ............... 439/345, 347, 350, 357, 439/358, 366, 372, 929; 24/522, 523, 479; 403/321, 325, 327

[56] References Cited

U.S. PATENT DOCUMENTS

| | | | |
|---|---|---|---|
| 3,740,696 | 6/1973 | Schleicher et al. | 439/347 |
| 4,146,682 | 3/1979 | Nakao | 439/347 X |
| 4,227,762 | 10/1980 | Scheiner | 439/347 |
| 4,435,029 | 3/1984 | McKenzie | 439/347 X |
| 4,454,382 | 6/1984 | Borne et al. | 439/347 X |
| 4,508,405 | 4/1985 | Damon et al. | 439/347 X |
| 4,588,938 | 5/1986 | Liautaud et al. | 439/929 |
| 5,030,902 | 7/1991 | Mattinger et al. | 439/929 X |

*Primary Examiner*—Larry I. Schwartz
*Assistant Examiner*—Khiem Nguyen
*Attorney, Agent, or Firm*—Pablo Meles; William E. Koch; Thomas G. Berry

[57] ABSTRACT

A carrier (10) for receiving a portable product (20) having a protruding member (24) on at least one of the surfaces of the portable product comprises a housing (2) having a recessed area (4) and an aperture (19) therein having rails (13) therein and a removably insertable latch assembly for insertion into the aperture. The latch assembly comprises a flexible member (6) that allows the insertion of a portion of the latch assembly into the aperture and allows the mounting of the flexible member in the recessed area, a boss (3, 5, 7, & 8) having a ramp (8) and a notch (7) coupled to the flexible member for sliding the latch assembly on the rails, and a spring (9) coupled to the boss for biasing the latch assembly in a first position (FIG. 7) and allowing the latch assembly to travel to a second position (FIG. 8) when the portable product is inserted in the carrier causing the protruding member to traverse the ramp and enter the notch, wherein the portable product is locked in the carrier with the latch assembly in the first position (FIG. 9).

20 Claims, 5 Drawing Sheets

LATCH ASSEMBLY AND CARRIER FOR A PORTABLE PRODUCT

TECHNICAL FIELD

This invention relates generally to latch assemblies and, more particularly, to a latch assembly in a carrier made for ease of assembly and disassembly.

BACKGROUND OF THE INVENTION

Carriers and particularly charger carriers for portable products are decreasing in size in step with the portable products themselves. The carriers and charger carriers are becoming more mobile and increasingly more subject to shock and vibration. Thus, a need exists for a carrier having an adequate means for securing the portable products to the carrier without adding excessive bulk and weight to the carrier or portable product. A further requirement of charger carriers is the accurate placement of the portable product into the charger, wherein the contacts of the portable product must mate with the contacts of the charger. Therefore, the means for securing the portable product to the charger must not only be adequate in securing, but accurate in placement and positioning.

Many of the cost cutting goals of present day manufacturing of products strive for ease of assembly as well as ease of disassembly. Existing latch mechanisms require undue number of piece parts and assembling steps, increasing the susceptibility of failure during assembly or during the subsequent use of the assembled product. Therefore, a new latch assembly and carrier is required which is of simpler design in terms of piece parts and assembling steps and that further meets the requirements of securing a product adequately and accurately.

SUMMARY OF THE INVENTION

A carrier for receiving a portable product having a protruding member on at least one of the surfaces of the portable product comprises a housing having a recessed area and an aperture therein having rails therein and a removably insertable latch assembly for insertion into the aperture. The latch assembly comprises a flexible member that allows the insertion of a portion of the latch assembly into the aperture and allows the mounting of the flexible member in the recessed area, a boss having a ramp and a notch coupled to the flexible member for sliding the latch assembly on the rails, and a spring coupled to the boss for biasing the latch assembly in a first position and allowing the latch assembly to travel to a second position when the portable product is inserted in the carrier causing the protruding member to traverse the ramp and enter the notch, wherein the portable product is locked in the carrier with the latch assembly in the first position.

DETAILED DESCRIPTION OF THE PREFERRED EMBODIMENT

Figure 1:
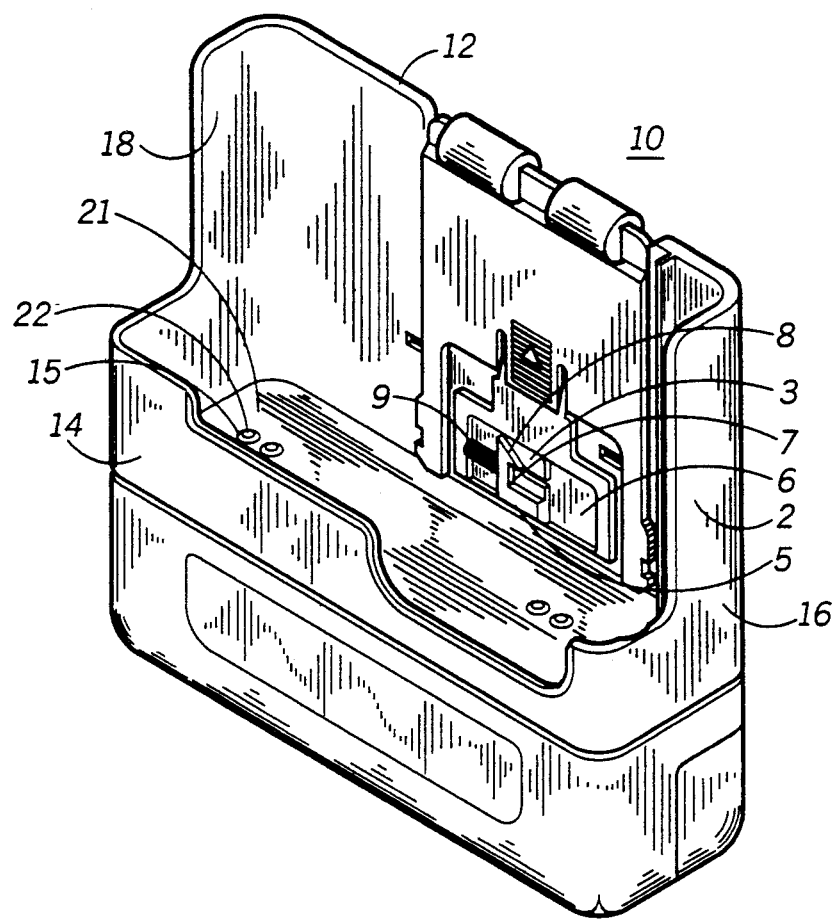
FIG. 1 is a perspective view of a carrier in accordance with the present invention.
Figure 2:
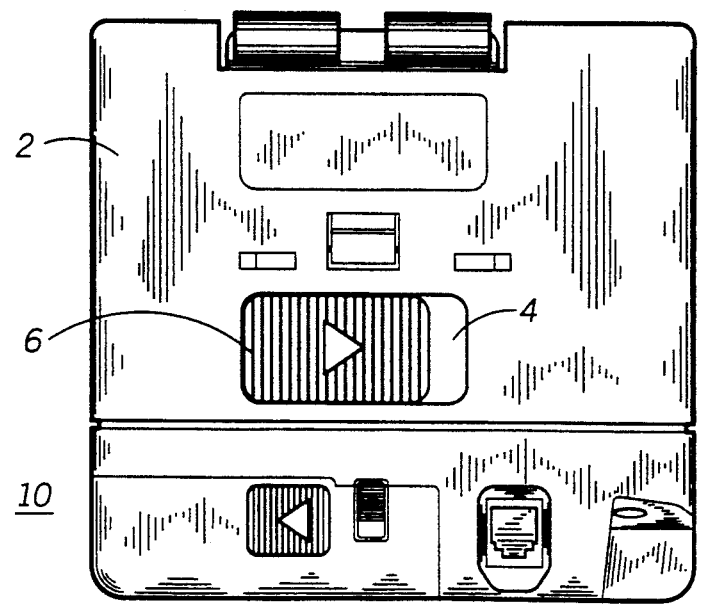
FIG. 2 is a rear elevational view of the carrier 10 of FIG. 1.

Referring to FIG. 1, there is shown a perspective view of a carrier 10 in accordance with the present invention. The carrier 10 is preferably a charger carrier comprising a housing 2 preferably made of a rigid plastic having back wall 12, a shortened front wall 14, and side walls 16 and 18. The four walls form the carrier cavity 21, wherein a portable product 20 (shown in FIG. 3) such as a selective call receiver or pager is inserted. The housing 2 further, comprises apertures 15, wherein spring loaded contacts 22 could protrude through the apertures 15. Referring to FIGS. 1 and 2, the carrier 10 further comprises a latch assembly comprising a flexible member 6, a boss having a notch 7 comprising ramp 8 and member 5 substantially in one vertical plane and member 3 in another vertical plane parallel to the first plane. The latch assembly further comprises a spring means 9, preferably a coiled spring integrally attached to the boss of the latch assembly. A portion of the latch assembly, more particularly the boss is inserted into an aperture 19 (shown in FIGS. 4-9) and the flexible member 6 remains in a recessed area 4. The carrier 10 allows a portable product 20, preferably a select call receiver or pager having a protruding member 24 (preferably a protruding rib) to be locked within the carrier using the latch assembly. Of course, other portable products and even other non-portable product are within contemplation for use with the carrier 10 with the latch assembly in accordance with the present invention.

Figure 4:
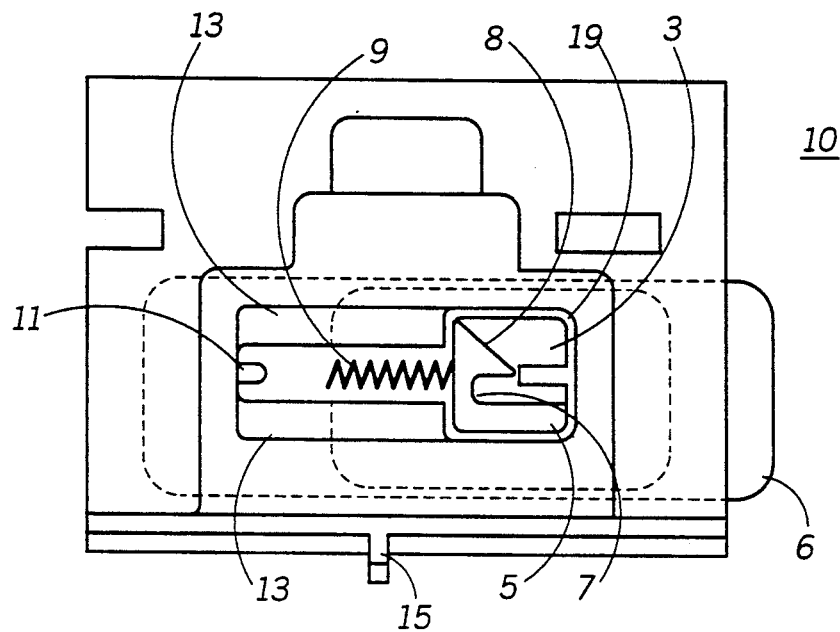
FIG. 4 is a front elevational view of the latch assembly portion of the carrier 10 being inserted into the carrier in accordance with the present invention.
Figure 5:
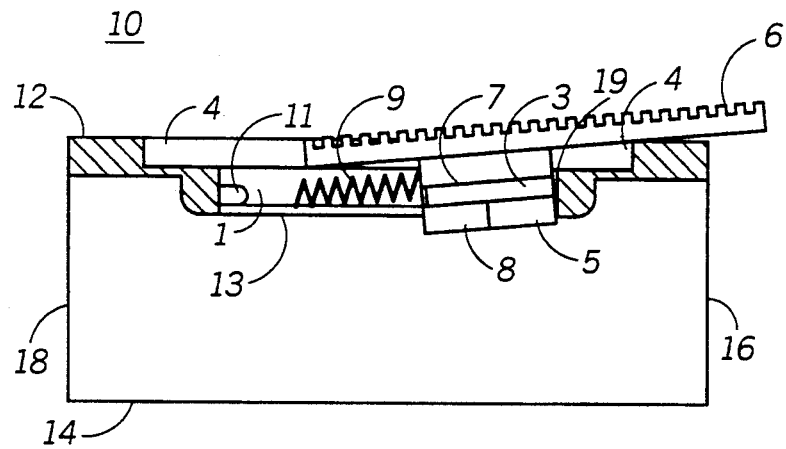
FIG. 5 is a top cut view of the latch assembly being inserted into the carrier 10 and the carrier walls in accordance with the present invention.

One of the main benefits of the present invention is the ease of assembly and disassembly of the latch assembly to the carrier 10 as shown in FIGS. 4 and 5. The latch assembly (3, 5, 6, 7 and 9) is preferably made from one molded piece part of plastic or from one molded piece part of plastic with a separate coil spring (9) integrally molded into the plastic. The plastic material for the latch assembly is preferably a flexible material with high yielding characteristics such as nylon or forms of polycarbonate. Structurally, although the latch assembly is preferably one piece part, it is easily described having different portions. The removably insertable latch assembly shown in FIGS. 4 and 5 comprises of a flexible member 6 that is substantially parallelpiped shaped. Optionally, the exterior of the flexible member 6 has some texturing to provide better tactile ergonomics. The latch assembly further comprises a boss (3, 5, 7, & 8) having a ramp member 8 and another member 5 in one vertical plane and a member 3 in another vertical plane parallel to the first plane. In between both vertical planes exists a notch 7 formed by the ramp member 8 and member 5. The spring means 9 is integrally attached to the boss.

Figure 6:
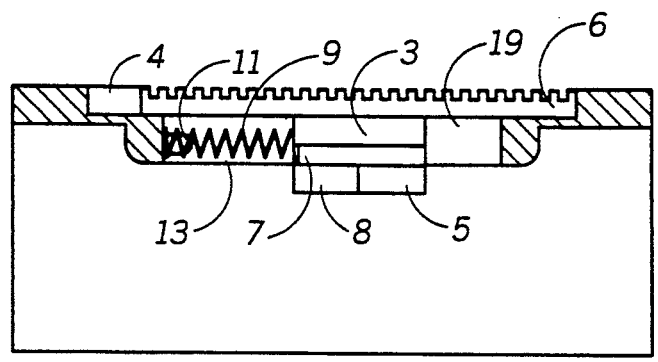
FIG. 6 is a top cut view of the latch assembly after insertion into the carrier 10 in accordance with the present invention.

In assembly, the boss and spring is installed into the carrier by slipping the boss and spring means 9 through an aperture 19 and then sliding the latch assembly onto rails 13 integrally formed in the carrier 10, particularly formed in a recessed area 1. Desirably, the aperture 19 is shaped or keyed to allow the insertion of the boss in only one manner. For instance, note that the radius of the curvature of the aperture 19 and of the boss (in particular, member 3) is greater on one side than that of the opposing side. Optionally, the carrier includes an integrally formed protrusion 11 formed in the carrier 10 to guide the spring means 9 during assembly. The sliding motion requires the flexible member 6 to bend outward as shown in FIGS. 5 & 6 until the boss is slid far enough for the flexible member 6 to drop into the recessed area 4. Referring to FIG. 6, the latch assembly would now be locked in place with the spring means 9 providing tension or biasing to keep the latch assembly in place. Note that the recessed area 4 is slightly longer than the length of the flexible member 6 to provide the transversal play of the latch assembly within the constraints of the recessed area 4.

Figure 3:
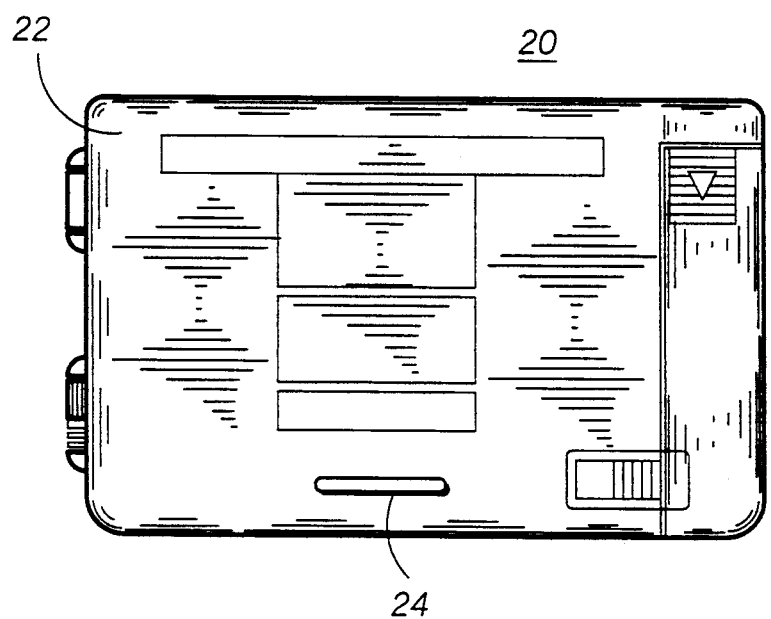
FIG. 3 is a perspective view of a portable product 20 with a protruding member 24 in accordance with the present invention.
Figure 7:
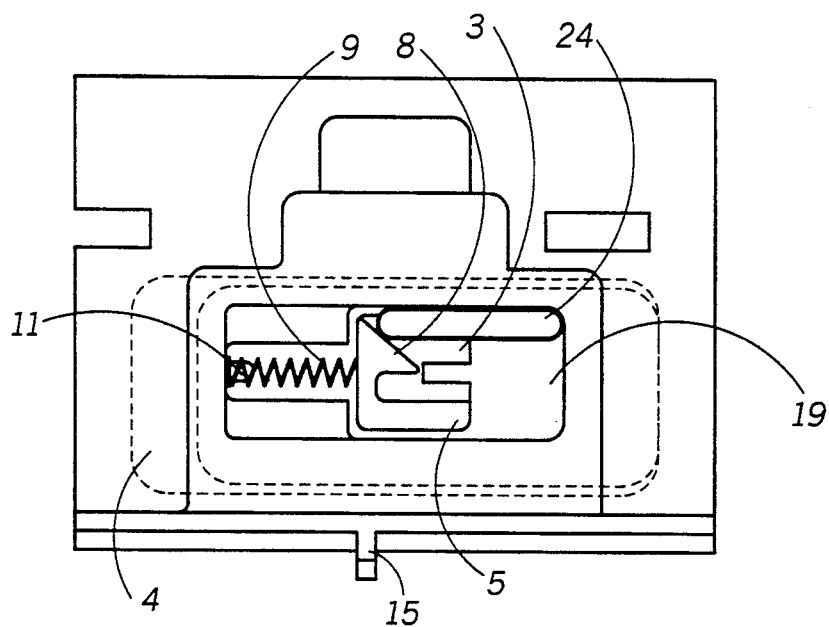
FIG. 7 is a front elevational view of the latch assembly portion showing the initial insertion of the portable product with a protruding member in accordance with the present invention.
Figure 8:
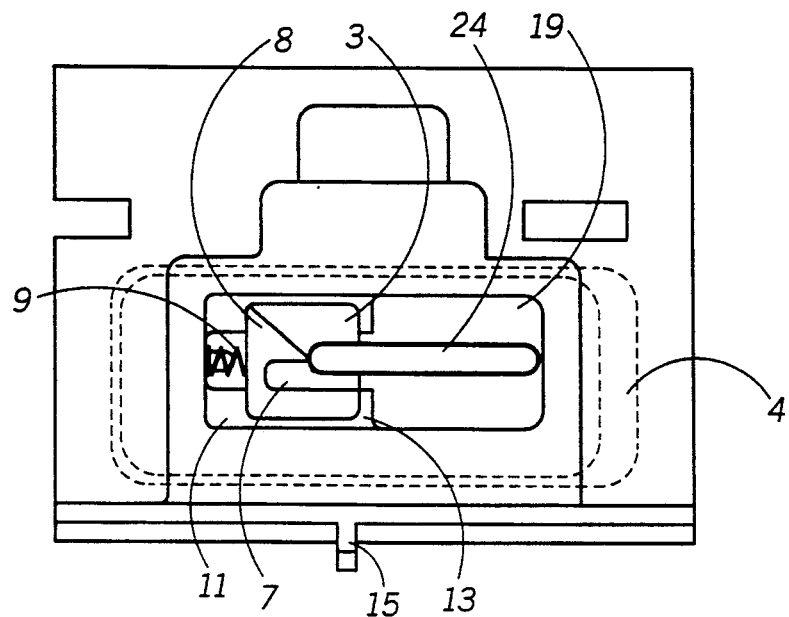
FIG. 8 is a front elevational view of the latch assembly portion showing the traversal of the protruding member along the latch assembly's ramp or the unlocked mode of the latch assembly both in accordance with the present invention.
Figure 9:
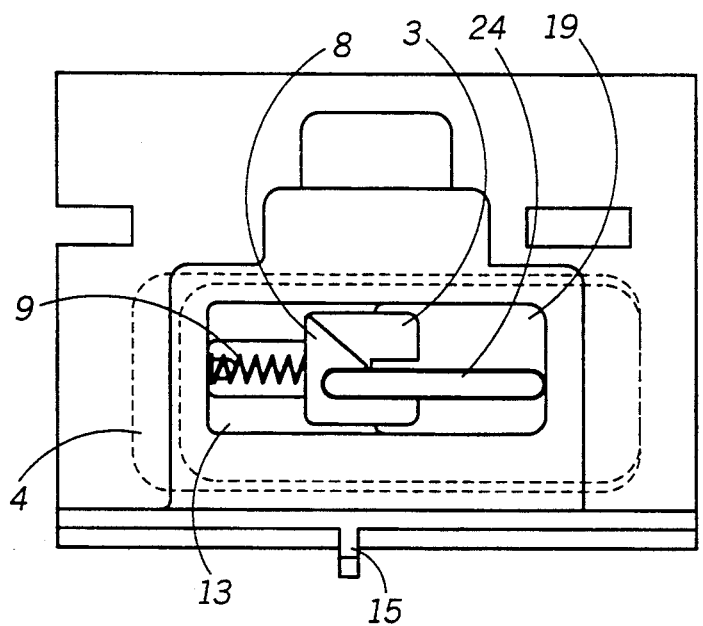
FIG. 9 is a front elevational view of the latch assembly portion and the protruding member in the locked mode in accordance with the present invention.

FIGS. 7, 8, and 9, illustrates the movement of the latch assembly in accordance with the present invention from the initial insertion of the protruding member 24 of the portable product 20 to the locking and subsequent removal of the portable product. Referring to FIGS. 1, 3 and 7, operationally, when the portable product 20 is inserted into the carrier cavity 21 with the protruding member 24 facing the latch assembly, the protruding member hits the leading edge ramp 8 on the boss and slides down the ramp forcing the latch assembly from a first or initial position shown in FIG. 7 to a second position shown in FIG. 8 by deflecting the spring means 9 while the ramp 8 moves out of the way. In other words, as the protruding member 24 slides downward, the latch assembly moves away perpendicularly relative to the motion of the protruding member, forcing the spring means 9 into compression. Once the protruding member 24 or rib passes by the ramp 8 as shown in FIG. 8, the latch assembly and in particular the spring 9 acts to move the latch assembly to the secured or locked position shown in FIG. 9. The locked position preferably leaves the latch assembly in the initial or first position as shown in FIG. 7.

To remove the portable product 20, the user slides the latch assembly toward the open position as shown in FIG. 8, thereby compressing the spring 9. Optionally, spring loaded contacts 22 (shown in FIG. 1) protrude through the bottom of the carrier cavity through holes 15 found in FIGS 1, and 7-9. The spring loaded contacts force the portable product 20 past the leading edge ramp 8 so the portable product is easily removed from the carrier 10. Once the portable product 20 and its protruding member 24 is removed, the latch assembly returns to the locked position as shown in FIG. 7.

What is claimed is:

1. A carrier for receiving a portable product having a protruding member on at least one of the surfaces of the portable product, comprising:
    a housing having recessed areas having rails therein and an aperture therein;
    a removably insertable latch assembly for insertion into said aperture, the latch assembly, comprising:
    a flexible member that allows the insertion of a portion of the latch assembly into the aperture and allows the mounting of the flexible member in one of the recessed areas;
    a boss coupled to said flexible member for sliding the latch assembly on the rails, said boss having a ramp and a notch;
    a spring means coupled to said boss for biasing the latch assembly in a first position and allowing the latch assembly to travel to a second position when the portable product is inserted in the carrier causing the protruding member to traverse the ramp and enter the notch, wherein the portable product is locked in the carrier with the latch assembly in the first position.

2. The carrier of claim 1, wherein said carrier for receiving the portable product is a charger.

3. The carrier of claim 1, wherein said flexible removably insertable latch member comprises of polycarbonate.

4. The carrier of claim 1, wherein said spring means comprises a coiled spring.

5. The carrier of claim 4, wherein said recessed areas further comprise an integral protrusion for guiding the coiled spring during assembly.

6. The carrier of claim 1, wherein said portable product comprises a pager.

7. The carrier of claim 1, wherein said aperture is keyed to allow the insertion of the boss in only one manner.

8. The carrier of claim 1, wherein said portable product is unlocked from the carrier by moving the latch member to the second position or further, wherein the spring means is compressed.

9. The carrier of claim 1, wherein said protruding member is a protruding rib feature.

10. A latch for retaining within a carrier, a portable product having a protruding rib on at least one of the surfaces of the portable product, the carrier having recessed areas having rails therein and an aperture therein, comprising:
    a removably insertable latch assembly for insertion into said aperture, the latch assembly comprising:
    a flexible member that allows the insertion of a portion of the latch assembly into the aperture and allows the mounting of the flexible member in one of the recessed areas;
    a boss coupled to said flexible member for sliding the latch member on the rails, said boss having a ramp and a rib receiving notch;
    a spring means coupled to said boss for biasing the latch member in a first position and allowing the latch member to travel to a second position when the portable product is inserted in the carrier causing the protruding rib to traverse the ramp and enter the rib receiving notch, wherein the portable product is locked in the carrier with the latch member in the first position.

11. The latch of claim 10, wherein said carrier for receiving the portable product is a charger.

12. The latch of claim 10, wherein said spring means comprises a coiled spring.

13. The latch of claim 12, wherein said recessed areas further comprise an integral protrusion for guiding the coiled spring.

14. The latch of claim 12, wherein said portable product is unlocked from the carrier by moving the latch member to the second position or further, wherein the spring means is compressed.

15. A carrier for a selective call receiver housing having a protruding rib on the back surface of the select call receiver housing, comprising;
   a carrier housing having recessed areas having rails therein and a keyed aperture therein;
   a removably insertable latch assembly for insertion into said aperture, the latch assembly comprising:
   a flexible member that allows the insertion of a portion of the latch assembly into the aperture and allows the mounting of the flexible member in the recessed area;
   a boss coupled to the flexible member and arranged and constructed for a unique insertion into the keyed aperture and for sliding the latch member on the rails, said boss having a ramp and a rib receiving notch;
   a spring means coupled to said boss for biasing the latch member in a first position and allowing the latch member to travel to a second position when the selective call receiver housing is inserted in the carrier causing the protruding rib to traverse the ramp and enter the rib receiving notch, wherein the portable product is locked in the carrier with the latch member in the first position.

16. The carrier of claim 15, wherein said carrier for receiving the portable product is a charger.

17. The carrier of claim 15, wherein said recessed areas further comprise an integral protrusion for guiding the spring means during assembly.

18. The carrier of claim 15, wherein said portable product is unlocked from the carrier by moving the latch member to the second position or further, wherein the spring means is compressed 19. The carrier of claim 15, wherein the ramp on the boss is a leading edge ramp.

20. The carrier of claim 19, wherein the carrier housing further comprises at least one aperture in a lower portion of the carrier housing where a spring loaded contact protrudes through said aperture in the lower portion to force the selective call receiver past the leading edge ramp for easier removal of the select call receiver when unlocked.

* * * * *